(12) United States Patent
Conrardy et al.

(10) Patent No.: US 9,230,449 B2
(45) Date of Patent: Jan. 5, 2016

(54) WELDING TRAINING SYSTEM

(75) Inventors: Christopher C. Conrardy, Columbus, OH (US); Victor M. Penrod, Hilliard, OH (US); Paul C. Boulware, Columbus, OH (US); Constance T. Reichert Lamorte, Columbus, OH (US)

(73) Assignee: Lincoln Global, Inc., City of Industry, CA (US)

( * ) Notice: Subject to any disclaimer, the term of this patent is extended or adjusted under 35 U.S.C. 154(b) by 766 days.

(21) Appl. No.: 12/966,570

(22) Filed: Dec. 13, 2010

(65) Prior Publication Data

US 2011/0117527 A1    May 19, 2011

Related U.S. Application Data

(63) Continuation-in-part of application No. 12/499,687, filed on Jul. 8, 2009.

(51) Int. Cl.
*G09B 19/24*     (2006.01)
*B23K 9/095*     (2006.01)
(Continued)

(52) U.S. Cl.
CPC ............. *G09B 19/24* (2013.01); *B23K 9/0956* (2013.01); *B23K 9/16* (2013.01); *B23K 9/291* (2013.01); *B23K 9/32* (2013.01); *B23K 37/04* (2013.01); *B23K 37/047* (2013.01); *G09B 25/02* (2013.01)

(58) Field of Classification Search
USPC ............... 434/219, 234, 260, 592; 29/407.04; 228/176; 382/275; 345/592; 702/103; 600/546; 219/137 R, 130.01
See application file for complete search history.

(56) References Cited

U.S. PATENT DOCUMENTS 1,159,119 A     11/1915   Springer
1,286,529 A     12/1918   Cave
(Continued)

FOREIGN PATENT DOCUMENTS

CA          2698078       9/2011
CN        201083660       7/2008
(Continued)

OTHER PUBLICATIONS

Back to Digital Imaging in Optical Microscopy, by Kenneth R. Spring, Thomas J. Fellers and Michael W. Davidson dated Mar. 1, 2005.   http://www.microscopyu.com/articles/digitalimaging/ccdintro.html.*

(Continued)

*Primary Examiner* — Robert J Utama
(74) *Attorney, Agent, or Firm* — Calfee, Halter & Griswold LLP

(57) ABSTRACT

A system for training welders that includes a data generating component, a data capturing component and a data processing and visualization component. The data generating component operates in real time and derives data from an actual manually-executed weld and further includes a weld process-specific jig, a calibration block positioned on the jig, wherein the geometric configuration of the calibration block is specific to a particular type of weld joint, a weld coupon positioned on the welding process-specific jig adjacent to the calibration block, a welding gun for use by a trainee, wherein the welding gun is operative to form the weld; and at least one target mounted on the welding gun that is recognized by the data processing and visualization component for providing multidimensional position and orientation feedback to the trainee.

28 Claims, 5 Drawing Sheets

(51) Int. Cl.
  *B23K 9/16* (2006.01)
  *B23K 9/29* (2006.01)
  *B23K 9/32* (2006.01)
  *B23K 37/04* (2006.01)
  *B23K 37/047* (2006.01)
  *G09B 25/02* (2006.01)

(56) References Cited

U.S. PATENT DOCUMENTS

| | | |
|---|---|---|
| 2,326,944 A | 8/1943 | Holand et al. |
| 2,333,192 A | 11/1943 | Moberg |
| D140,630 S | 3/1945 | Garibay |
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,562,927 A | 2/1971 | Moskowitz |
| 3,562,928 A | 2/1971 | Schmitt |
| 3,621,177 A | 11/1971 | Freeman et al. |
| 3,654,421 A | 4/1972 | Streetman et al. |
| 3,690,020 A | 9/1972 | McBratnie |
| 3,739,140 A | 6/1973 | Rotilio |
| 3,866,011 A | 2/1975 | Cole |
| 3,867,769 A | 2/1975 | Schow et al. |
| 3,904,845 A * | 9/1975 | Minkiewicz .................. 228/176 |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros et al. |
| 4,280,041 A | 7/1981 | Kiessling et al. |
| 4,280,137 A | 7/1981 | Ashida et al. |
| 4,314,125 A | 2/1982 | Nakamura |
| 4,359,622 A | 11/1982 | Dostoomian et al. |
| 4,375,026 A | 2/1983 | Kearney |
| 4,410,787 A | 10/1983 | Kremers et al. |
| 4,429,266 A | 1/1984 | Tradt |
| 4,452,589 A | 6/1984 | Denison |
| D275,292 S | 8/1984 | Bouman |
| D277,761 S | 2/1985 | Korovin et al. |
| D280,329 S | 8/1985 | Bouman |
| 4,611,111 A | 9/1986 | Baheti et al. |
| 4,616,326 A | 10/1986 | Meier et al. |
| 4,629,860 A | 12/1986 | Lindbom |
| 4,677,277 A | 6/1987 | Cook et al. |
| 4,680,014 A | 7/1987 | Paton et al. |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,812,614 A | 3/1989 | Wang et al. |
| 4,867,685 A | 9/1989 | Brush et al. |
| 4,877,940 A | 10/1989 | Bangs et al. |
| 4,897,521 A | 1/1990 | Burr |
| 4,907,973 A | 3/1990 | Hon |
| 4,931,018 A | 6/1990 | Herbst et al. |
| 4,998,050 A | 3/1991 | Nishiyama et al. |
| 5,034,593 A | 7/1991 | Rice et al. |
| 5,061,841 A | 10/1991 | Richardson |
| 5,089,914 A | 2/1992 | Prescott |
| 5,192,845 A | 3/1993 | Kirmsse et al. |
| 5,206,472 A | 4/1993 | Myking et al. |
| 5,266,930 A | 11/1993 | Ichikawa et al. |
| 5,283,418 A | 2/1994 | Bellows et al. |
| 5,285,916 A | 2/1994 | Ross |
| 5,288,968 A | 2/1994 | Cecil |
| 5,305,183 A | 4/1994 | Teynor |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,362,962 A | 11/1994 | Barborak et al. |
| 5,370,071 A | 12/1994 | Ackermann |
| D359,296 S | 6/1995 | Witherspoon |
| 5,424,634 A | 6/1995 | Goldfarb et al. |
| 5,436,638 A | 7/1995 | Bolas et al. |
| 5,464,957 A | 11/1995 | Kidwell et al. |
| 5,465,037 A | 11/1995 | Huissoon et al. |
| D365,583 S | 12/1995 | Viken |
| 5,493,093 A | 2/1996 | Cecil |
| 5,562,843 A | 10/1996 | Yasumoto |
| 5,670,071 A | 9/1997 | Ueyama et al. |
| 5,676,503 A | 10/1997 | Lang |
| 5,676,867 A | 10/1997 | Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,751,258 A | 5/1998 | Fergason et al. |
| D395,296 S | 6/1998 | Kaye et al. |
| 5,774,110 A | 6/1998 | Edelson |
| D396,238 S | 7/1998 | Schmitt |
| 5,781,258 A | 7/1998 | Dabral et al. |
| 5,823,785 A | 10/1998 | Matherne, Jr. |
| 5,835,077 A | 11/1998 | Dao et al. |
| 5,835,277 A | 11/1998 | Hegg |
| 5,845,053 A | 12/1998 | Watanabe et al. |
| 5,963,891 A | 10/1999 | Walker et al. |
| 6,008,470 A | 12/1999 | Zhang et al. |
| 6,049,059 A | 4/2000 | Kim |
| 6,051,805 A | 4/2000 | Vaidya et al. |
| 6,114,645 A | 9/2000 | Burgess |
| 6,155,475 A | 12/2000 | Ekelof et al. |
| 6,155,928 A | 12/2000 | Burdick |
| 6,230,327 B1 | 5/2001 | Briand et al. |
| 6,236,013 B1 | 5/2001 | Delzenne |
| 6,236,017 B1 | 5/2001 | Smartt et al. |
| 6,242,711 B1 | 6/2001 | Cooper |
| 6,271,500 B1 | 8/2001 | Hirayama et al. |
| 6,301,763 B1 * | 10/2001 | Pryor .......................... 29/407.04 |
| 6,330,938 B1 | 12/2001 | Herve et al. |
| 6,330,966 B1 | 12/2001 | Eissfeller |
| 6,331,848 B1 | 12/2001 | Stove et al. |
| D456,428 S | 4/2002 | Aronson et al. |
| 6,373,465 B2 | 4/2002 | Jolly et al. |
| 6,377,011 B1 | 4/2002 | Ben-Ur |
| D456,828 S | 5/2002 | Aronson et al. |
| 6,396,232 B2 | 5/2002 | Haanpaa et al. |
| D461,383 S | 8/2002 | Blackburn |
| 6,427,352 B1 | 8/2002 | Pfeiffer et al. |
| 6,441,342 B1 | 8/2002 | Hsu |
| 6,445,964 B1 | 9/2002 | White et al. |
| 6,492,618 B1 | 12/2002 | Flood et al. |
| 6,506,997 B2 | 1/2003 | Matsuyama |
| 6,552,303 B1 | 4/2003 | Blankenship et al. |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,593,540 B1 | 7/2003 | Baker et al. |
| 6,621,049 B2 | 9/2003 | Suzuki |
| 6,624,388 B1 | 9/2003 | Blankenship et al. |
| D482,171 S | 11/2003 | Vui et al. |
| 6,647,288 B2 * | 11/2003 | Madill et al. .................. 600/546 |
| 6,649,858 B2 | 11/2003 | Wakeman |
| 6,655,645 B1 | 12/2003 | Lu et al. |
| 6,660,965 B2 | 12/2003 | Simpson |
| 6,697,701 B2 | 2/2004 | Hillen et al. |
| 6,697,770 B1 | 2/2004 | Nagetgaal |
| 6,703,585 B2 | 3/2004 | Suzuki |

(56) References Cited

U.S. PATENT DOCUMENTS

| | | |
|---|---|---|
| 6,708,385 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,533 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,039 B2 | 9/2005 | Blankenship et al. |
| 6,982,700 B2 | 1/2006 | Rosenberg et al. |
| 7,021,937 B2 | 4/2006 | Simpson et al. |
| 7,110,859 B2 | 9/2006 | Shibata et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey |
| 7,233,837 B2 | 6/2007 | Swain et al. |
| 7,247,814 B2 | 7/2007 | Ott |
| D555,446 S | 11/2007 | Ibarrondo |
| 7,298,535 B2 | 11/2007 | Kuutti |
| D561,973 S | 2/2008 | Kinsley et al. |
| 7,353,715 B2 | 4/2008 | Myers |
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,474,760 B2 | 1/2009 | Hertzman et al. |
| 7,478,108 B2 | 1/2009 | Townsend et al. |
| 7,487,018 B2 | 2/2009 | Afshar et al. |
| D587,975 S | 3/2009 | Aronson et al. |
| 7,516,022 B2 | 4/2009 | Lee et al. |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 * | 10/2010 | Bolick et al. ............... 345/592 |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 * | 9/2012 | Wallace ............... 219/137 R |
| 8,287,522 B2 | 10/2012 | Moses et al. |
| 8,301,286 B2 | 10/2012 | Babu |
| 8,316,462 B2 | 11/2012 | Becker et al. |
| 8,363,048 B2 | 1/2013 | Gering |
| 8,365,603 B2 | 2/2013 | Lesage et al. |
| 8,512,043 B2 | 8/2013 | Choquet |
| 8,569,646 B2 | 10/2013 | Daniel et al. |
| 8,592,723 B2 | 11/2013 | Davidson et al. |
| 8,657,605 B2 | 2/2014 | Wallace et al. |
| 8,692,157 B2 | 4/2014 | Daniel et al. |
| 8,747,116 B2 | 6/2014 | Zboray et al. |
| 8,777,629 B2 | 7/2014 | Kreindl et al. |
| 8,787,051 B2 | 7/2014 | Chang et al. |
| 8,834,168 B2 | 9/2014 | Peters et al. |
| 8,851,896 B2 | 10/2014 | Wallace et al. |
| 8,911,237 B2 | 12/2014 | Postlethwaite et al. |
| 8,915,740 B2 | 12/2014 | Zboray et al. |
| RE45,398 E | 3/2015 | Wallace |
| 9,011,154 B2 | 4/2015 | Kindig et al. |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0039138 A1 | 4/2002 | Edelson et al. |
| 2002/0046999 A1 | 4/2002 | Veikkolainen et al. |
| 2002/0050984 A1 | 5/2002 | Roberts |
| 2002/0054211 A1 | 5/2002 | Edelson et al. |
| 2002/0085843 A1 | 7/2002 | Mann |
| 2002/0094026 A1 | 7/2002 | Edelson |
| 2002/0135695 A1 | 9/2002 | Edelson et al. |
| 2002/0175897 A1 | 11/2002 | Pelosi |
| 2002/0180761 A1 | 12/2002 | Edelson et al. |
| 2003/0000931 A1 | 1/2003 | Ueda et al. |
| 2003/0002740 A1 | 1/2003 | Melikian |
| 2003/0023592 A1 | 1/2003 | Modica et al. |
| 2003/0025884 A1 | 2/2003 | Hamana et al. |
| 2003/0106787 A1 | 6/2003 | Santilli |
| 2003/0111451 A1 | 6/2003 | Blankenship et al. |
| 2003/0172032 A1 | 9/2003 | Choquet |
| 2003/0228560 A1 | 12/2003 | Seat et al. |
| 2003/0234885 A1 | 12/2003 | Pilu |
| 2004/0020907 A1 | 2/2004 | Zauner et al. |
| 2004/0035990 A1 | 2/2004 | Ackeret |
| 2004/0050824 A1 | 3/2004 | Samler |
| 2004/0140301 A1 | 7/2004 | Blankenship et al. |
| 2005/0007504 A1 | 1/2005 | Fergason |
| 2005/0017152 A1 | 1/2005 | Fergason |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0128186 A1 | 6/2005 | Shahoian et al. |
| 2005/0133488 A1 | 6/2005 | Blankenship |
| 2005/0159840 A1 | 7/2005 | Lin et al. |
| 2005/0189336 A1 | 9/2005 | Ku |
| 2005/0199602 A1 | 9/2005 | Kaddani et al. |
| 2005/0230573 A1 | 10/2005 | Ligertwood |
| 2005/0252897 A1 | 11/2005 | Hsu et al. |
| 2005/0275913 A1 | 12/2005 | Vesely et al. |
| 2005/0275914 A1 | 12/2005 | Vesely et al. |
| 2006/0014130 A1 | 1/2006 | Weinstein |
| 2006/0136183 A1 | 6/2006 | Choquet |
| 2006/0140502 A1 * | 6/2006 | Tseng et al. ............... 382/275 |
| 2006/0163227 A1 | 7/2006 | Hillen et al. |
| 2006/0169682 A1 | 8/2006 | Kainec et al. |
| 2006/0173619 A1 | 8/2006 | Brant et al. |
| 2006/0189260 A1 | 8/2006 | Sung |
| 2006/0207980 A1 | 9/2006 | Jacovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0241432 A1 | 10/2006 | Herline et al. |
| 2006/0252543 A1 | 11/2006 | Van Noland et al. |
| 2006/0258447 A1 | 11/2006 | Baszucki et al. |
| 2007/0034611 A1 | 2/2007 | Drius et al. |
| 2007/0038400 A1 * | 2/2007 | Lee et al. ............... 702/103 |
| 2007/0045488 A1 | 3/2007 | Shin |
| 2007/0088536 A1 | 4/2007 | Ishikawa |
| 2007/0112889 A1 | 5/2007 | Cook et al. |
| 2007/0188606 A1 | 8/2007 | Atkinson et al. |
| 2007/0198117 A1 | 8/2007 | Wajihuddin |
| 2007/0211026 A1 | 9/2007 | Ohta et al. |
| 2007/0221797 A1 | 9/2007 | Thompson et al. |
| 2007/0256503 A1 | 11/2007 | Wong et al. |
| 2007/0264619 A1 * | 11/2007 | Maddix et al. ............... 434/219 |
| 2007/0277611 A1 | 12/2007 | Portzgen et al. |
| 2007/0291035 A1 | 12/2007 | Vesely et al. |
| 2008/0021311 A1 | 1/2008 | Goldbach |
| 2008/0027594 A1 | 1/2008 | Jump et al. |
| 2008/0031774 A1 | 2/2008 | Magnant et al. |
| 2008/0038702 A1 * | 2/2008 | Choquet ............... 434/260 |
| 2008/0078811 A1 | 4/2008 | Hillen et al. |

(56) References Cited

U.S. PATENT DOCUMENTS

| | | |
|---|---|---|
| 2008/0078812 A1 | 4/2008 | Peters et al. |
| 2008/0107345 A1 | 5/2008 | Melikian |
| 2008/0117203 A1 | 5/2008 | Gering |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0203075 A1 | 8/2008 | Feldhausen et al. |
| 2008/0233550 A1 | 9/2008 | Solomon |
| 2008/0303197 A1 | 12/2008 | Paquette et al. |
| 2008/0314887 A1 | 12/2008 | Stoger et al. |
| 2009/0015585 A1 | 1/2009 | Klusza |
| 2009/0021514 A1 | 1/2009 | Klusza |
| 2009/0045183 A1 | 2/2009 | Artelsmair et al. |
| 2009/0057286 A1 | 3/2009 | Ihara et al. |
| 2009/0109128 A1 | 4/2009 | Nangle |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0197228 A1 | 8/2009 | Afshar et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0257655 A1 | 10/2009 | Melikian |
| 2009/0259444 A1 | 10/2009 | Dolansky et al. |
| 2009/0298024 A1* | 12/2009 | Batzler et al. ............... 434/234 |
| 2009/0325699 A1 | 12/2009 | Delgiannidis |
| 2010/0012017 A1 | 1/2010 | Miller |
| 2010/0012637 A1 | 1/2010 | Jaeger |
| 2010/0021051 A1 | 1/2010 | Melikian |
| 2010/0048273 A1 | 2/2010 | Wallace et al. |
| 2010/0062405 A1 | 3/2010 | Zboray et al. |
| 2010/0062406 A1* | 3/2010 | Zboray et al. ............... 434/234 |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0176107 A1 | 7/2010 | Bong |
| 2010/0201803 A1 | 8/2010 | Melikian |
| 2010/0224610 A1* | 9/2010 | Wallace ............... 219/137 R |
| 2010/0276396 A1 | 11/2010 | Cooper |
| 2010/0299101 A1 | 11/2010 | Shimada et al. |
| 2010/0307249 A1 | 12/2010 | Lesage et al. |
| 2011/0006047 A1* | 1/2011 | Penrod et al. ............ 219/137 R |
| 2011/0048273 A1 | 3/2011 | Colon |
| 2011/0052046 A1 | 3/2011 | Melikian |
| 2011/0060568 A1 | 3/2011 | Goldfine |
| 2011/0082728 A1 | 4/2011 | Melikian |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1* | 5/2011 | Conrardy et al. ............ 434/234 |
| 2011/0122495 A1 | 5/2011 | Togashi |
| 2011/0183304 A1 | 7/2011 | Wallace et al. |
| 2011/0187859 A1 | 8/2011 | Edelson |
| 2011/0248864 A1 | 10/2011 | Becker et al. |
| 2011/0316516 A1 | 12/2011 | Schiefermuller et al. |
| 2012/0189993 A1 | 7/2012 | Kindig et al. |
| 2012/0291172 A1 | 11/2012 | Wills et al. |
| 2012/0298640 A1* | 11/2012 | Conrardy et al. ........ 219/130.01 |
| 2013/0026150 A1 | 1/2013 | Chantry et al. |
| 2013/0040270 A1 | 2/2013 | Albrecht |
| 2013/0075380 A1 | 3/2013 | Albrech et al. |
| 2013/0170259 A1 | 7/2013 | Chang et al. |
| 2013/0182070 A1 | 7/2013 | Peters et al. |
| 2013/0183645 A1 | 7/2013 | Wallace et al. |
| 2013/0189657 A1 | 7/2013 | Wallace et al. |
| 2013/0189658 A1 | 7/2013 | Peters et al. |
| 2013/0209976 A1 | 8/2013 | Postlewaite et al. |
| 2013/0230832 A1 | 9/2013 | Peters et al. |
| 2013/0288211 A1 | 10/2013 | Patterson et al. |
| 2013/0342678 A1 | 12/2013 | McAninch et al. |
| 2014/0038143 A1 | 2/2014 | Daniel |
| 2014/0042136 A1 | 2/2014 | Daniel et al. |
| 2014/0134580 A1 | 5/2014 | Becker |
| 2014/0263224 A1 | 9/2014 | Becker |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2015/0056586 A1 | 2/2015 | Penrod |

FOREIGN PATENT DOCUMENTS

| | | |
|---|---|---|
| CN | 201149744 | 11/2008 |
| CN | 101406978 | 4/2009 |
| CN | 101419755 | 4/2009 |
| CN | 201229711 | 4/2009 |
| CN | 101571887 | 11/2009 |
| CN | 101587659 | 11/2009 |
| CN | 203503228 | 3/2014 |
| CN | 103871279 | 6/2014 |
| DE | 2833638 | 2/1980 |
| DE | 3046634 | 1/1984 |
| DE | 3522581 | 1/1987 |
| DE | 4037879 | 6/1991 |
| DE | 19615069 | 10/1997 |
| DE | 19739720 | 10/1998 |
| DE | 19834205 | 2/2000 |
| DE | 20009543 | 8/2001 |
| DE | 102005047204 | 4/2007 |
| DE | 102006048165 | 1/2008 |
| DE | 102010038902 | 2/2012 |
| EP | 108599 | 5/1984 |
| EP | 127299 | 12/1984 |
| EP | 145891 | 6/1985 |
| EP | 319623 | 10/1990 |
| EP | 852986 | 7/1998 |
| EP | 1527852 | 5/2005 |
| EP | 1905533 | 4/2008 |
| ES | 2274736 | 5/2007 |
| FR | 1456780 | 3/1965 |
| FR | 2827066 | 1/2003 |
| FR | 2926660 | 7/2009 |
| GB | 1455972 | 11/1976 |
| GB | 1511608 | 5/1978 |
| GB | 2254172 | 9/1992 |
| GB | 2435838 | 9/2007 |
| GB | 2454232 | 5/2009 |
| JP | 02224877 | 9/1990 |
| JP | 05329645 | 12/1993 |
| JP | 07047471 | 2/1995 |
| JP | 07232270 | 9/1995 |
| JP | 08505091 | 4/1996 |
| JP | 08150476 | 6/1996 |
| JP | 08132274 | 5/1998 |
| JP | 2000167666 | 6/2000 |
| JP | 2001071140 | 3/2001 |
| JP | 2003200372 | 7/2003 |
| JP | 2003326362 | 11/2003 |
| JP | 2006006604 | 1/2006 |
| JP | 2006281270 | 10/2006 |
| JP | 2007-290025 | 11/2007 |
| JP | 2009500178 | 1/2009 |
| JP | 2009-160636 | 7/2009 |
| RU | 527045 | 7/1995 |
| RU | 2317183 | 2/2008 |
| SU | 10388963 | 8/1983 |
| WO | 98/45078 | 10/1998 |
| WO | 01/12376 | 2/2001 |
| WO | 01/43910 | 6/2001 |
| WO | 01/58400 | 8/2001 |
| WO | 2004/029549 | 4/2004 |
| WO | 2005102230 A1 | 11/2005 |
| WO | 2005110658 A2 | 11/2005 |
| WO | 2006/034571 | 4/2006 |
| WO | 2007/039278 | 4/2007 |
| WO | 2009/060231 | 5/2009 |
| WO | 2009/120921 | 10/2009 |
| WO | 2009/149740 | 12/2009 |
| WO | 2010/000003 | 1/2010 |
| WO | 2010/044982 | 4/2010 |
| WO | 2010/091493 | 8/2010 |
| WO | 2011/058433 | 5/2011 |

(56) References Cited

FOREIGN PATENT DOCUMENTS

| | | |
|---|---|---|
| WO | 2011/059502 | 5/2011 |
| WO | 2011/067447 | 6/2011 |
| WO | 2011/097035 | 8/2011 |
| WO | 2012/016851 | 2/2012 |
| WO | 2012/082105 | 6/2012 |
| WO | 2012/143327 | 10/2012 |
| WO | 2013/014202 | 1/2013 |
| WO | 2013/061518 A1 | 5/2013 |
| WO | 2013/114189 | 8/2013 |
| WO | 2013/119749 | 8/2013 |
| WO | 2013/175079 | 11/2013 |
| WO | 2013/186413 | 12/2013 |
| WO | 2014/007830 | 1/2014 |
| WO | 2014/019045 | 2/2014 |
| WO | 2014/020386 | 2/2014 |
| WO | 2014/140720 | 9/2014 |
| WO | 2014/184710 | 11/2014 |

OTHER PUBLICATIONS

International Search Report and Written Opinion received in PCT/US2010/060129, Date of Mailing Feb. 10, 2011.
International Search Report and Written Opinion from PCT/IB/2009/006605 dated Feb. 12, 2010.
International Search Report and Written Opinion from PCT/IB10/02913 dated Apr. 19, 2011.
International Search Report and Written Opinion from PCT/IB2014/002346 dated Feb. 24, 2015.
International Search Report and Written Opinion from PCT/IB2015/000161 dated Jun. 8, 2015.
International Search Report and Written Opinion from PCT/IB2015/000257 dated Jul. 3, 2015.
Office action from U.S. Appl. No. 14/444,173 dated Mar. 18, 2015.
Response to Office Action dated Mar. 18, 2015 from U.S. Appl. No. 14/444,173 dated Jun. 11, 2015.
Notice of Allowance from U.S. 13/543,240 dated Jun. 11, 2015.
Notice of Allowance from U.S. 14/444,173 dated Jun. 24, 2015.
16th International Ship and Offshore Structures Congress: Aug. 20-25, 2006; Southhampton, U.K. vol. 2 Specialist Committee V.3 Fabrication Technology Committee Mandate: T. Borzecki, G. Bruce, Y.S. Han, M. Heinermann, A. Imakita, L. Josefson, W. Nie, D. Olsen, F. Roland and Y. Takeda. Naval Ship Design, ABS Papers 2006.
M. Abbas, F. Waeckel, Code Aster (Software) EDF (France), 29 pages, Oct. 2001.
Abbas, M., et al.; Code_Aster; User Manual; Booklet U1.0-: Introduction to Code_Aster;Document: U1.02.00; Version 7.4; Jul. 22, 2005.
Abid, et al., "Numerical Simulation to study the effect of tack welds and root gap on welding deformations and residual stresses of a pipe flange joint" Intl. J. of Pressure Vessels and Piping, 82, pp. 860-871 (2005).
M. Abida and M. Siddique, Numerical simulation to study the effect of tack welds and root gap on welding deformations and residual stresses of a pipe-flange joint, Faculty of Mechanical Engineering, GIK Institute of Engineering Sciences and Technology, Topi, NWFP, Pakistan, 12 pages, Available on-line Aug. 25, 2005.
Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.
Aidun et al., "Penetration in Spot GTA Welds during Centrifugation," Journal of Materials Engineering and Performance vol. 7(5) Oct. 1998—597-600.
ANSI/AWS D 10.11 MID 10. 11 :2007 Guide for Root Pass Welding of Pipe without Backing Edition: 3rd American Welding Society / Oct. 13, 2006/36 pages ISBN: 0871716445, 6 pages.
Antonelli, et al., "A Semi-Automated Welding Station Exploiting Human-robot Interaction", Dept. of Production Systems and Economics, pp. 249-260, 2011.
Arc+ simulator; 2 pgs., http://www.123arc.com/en/depliant_ang.pdf; 2000.
Asciencetutor.Com, A division of Advanced Science and Automation Corp., VWL (Virtual Welding Lab), 2 pages, 2007.
ASME Definitions, Consumables, Welding Positions, dated Mar. 19, 2001. See http://www.gowelding.com/wp/asme4.htm.
B. Virtual Reality Welder Trainer, Session 5, joining Technologies for Naval Applications, earliest date Jul. 14, 2006 (Nancy Porter of EWI).
Balijepalli, A. and Kesavadas, "Haptic Based Virtual Gringing Tool", Haptic Interfaces for Virtual Environment and Teleoperator Systems, Haptics 2003, 7-., Department of Mechanical & Aerospace Engineering, State University of New York at Buffalo, NY.
T. Borzecki, G. Bruce, YS. Han, et al., Specialist Committee V.3 Fabrication Technology Committee Mandate, Aug. 20-25, 2006, 49 pages, vol. 2, 16th International Ship and Offshore Structures Congress, Southampton, UK.
Boss (engineering), Wikipedia, 1 page, printed Feb. 6, 2014.
ChemWeb.com, Journal of Materials Engineering and Performance (v.7, #5), 3 pgs., printed Sep. 26, 2012.
S.B. Chen, L. Wu, Q. L. Wang and Y. C. Liu, Self-Learning Fuzzy Neural Networks and Computer Vision for Control of Pulsed GTAW, Welding Research Supplement, pp. 201-209, dated May 1997.
Choquet, Claude; "ARC+: Today's Virtual Reality Solution for Welders" Internet Page, Jan. 1, 2008, 6 pages.
Code Aster (Software) EDF (France), Oct. 2001.
Cooperative Research Program, Virtual Reality Welder Training, Summary Report SR 0512, 4 pages, Jul. 2005.
CS Wave, The Virtual Welding Trainer, 6 pages, 2007.
CS Wave, A Virtual learning tool for welding motion, 10 pages, Mar. 14, 2008.
CS Wave, Product Description, 2 pages, printed Jan. 14, 2015.
Desroches, X.; Code-Aster, Note of use for calculations of welding; Instruction manual U2.03 booklet: Thermomechanical; Document: U2.03.05; Oct. 1, 2013.
D'Huart, Deat, and Lium; Virtual Environment for Training: An Art of Enhancing Reality, 6th International Conference, ITS 20002, Biarritz, France and San Sebastian, Spain, 6 pages, Jun. 2002.
Kyt Dotson, Augmented Reality Welding Helmet Prototypes How Awesome the Technology Can Get, Sep. 26, 2012, Retrieved from the Internet: URL:http://siliconangle.com/blog/2012/09/26/augmented-reality-welding-helmet-prototypes-how-awesome-the-technology-can-get/, 1 page, retrieved on Sep. 26, 2014.
Echtler et al., "The Intelligent Welding Gun: Augmented Reality of Experimental Vehicle Construction", Virtual and Augmented Reality Applications in Manufacturing, 17, pp. 1-27, Springer Verlag, 2003.
Edison Welding Institute, E-Weld Predictor, 3 pages, 2008.
Eduwelding+, Weld Into the Future; Online Welding Seminar—A virtual training environment; 123arc.com; 4 pages, 2005.
Eduwelding+, Training Activities with arc+ simulator; Weld Into The Future, Online Welding Simulator—A virtual training environment; 123arc.com; 6 pages, May 2008.
Erden, "Skill Assistance with Robot for Manual Welding", Marie Curie Intra-European Fellowship, Project No. 297857, 3 pgs., printed Apr. 27, 2015.
EWM Virtual Welding Trainer, 2 pages, printed Jan. 14, 2015.
The Fabricator, Virtually Welding, Training in a virtual environment gives welding students a leg up, 4 pages, Mar. 2008.
Fast, K. et al., "Virtual Training for Welding", Mixed and Augmented Reality, 2004, ISMAR 2004, Third IEEE and CM International Symposium on Arlington, VA, Nov. 2-5, 2004.
Fillet weld, Wikipedia, 3 pgs. Printed Feb. 6, 2014.
Fronius, ARS Electronica Linz Gmbh, High-speed video technology is applied to research on welding equipment, and the results are visualized in the CAVE, 2 pages, May 18, 1997.
Fronius, Virtual Welding, 8 pages, printed Jan. 14, 2015.
FH Joanneum, Fronius—virtual welding, 2 pages, May 12, 2008.
Fronius, Virtual Welding/The Welder Training of the Future!, 8 page brochure, 2011.
P. Beatriz Garcia-Allende, Jesus Mirapeix, Olga M. Conde, Adolfo Cobo and Jose M. Lopezhiguera; Defect Detection in Arc-Welding

(56) References Cited

OTHER PUBLICATIONS

Processes by Means of the Line-to-Continuum Method and Feature Selection; www.mdpi.comfjournal/sensors; Sensors 2009, 9, 7753-7770; doi; 10.3390/s91007753.

"Numerical Analysis of Metal Transfer in Gas Metal Arc Welding," G. Wang, P.G. Huang, and Y.M. Zhang. Departments of Mechanical and Electrical Engineering. University of Kentucky, Dec. 10, 2001. Numerical Analysis of Metal Transfer in Gas Metal Arc Welding Under Modified Pulsed Current Conditions, G. Wang, P.G. Huang, and Y.M. Zhang. Metallurgical and Materials Transactions B, vol. 35B, Oct. 2004, pp. 857-866.

Wang et al., Study on welder training by means of haptic guidance and virtual reality for arc welding, 2006 IEEE International Conference on Robotics and Biomimetics, ROBIO 2006 ISBN-10: 1424405718, p. 954-958.

Weld nut, Wikipedia, 2 pgs. Printed Feb. 6, 2014.

Weldplus, Welding Simulator, 2 pages, printed Jan. 14, 2005.

White et al., Virtual welder trainer, 2009 IEEE Virtual Reality Conference, p. 303, 2009.

Chuansong Wu: "Microcomputer-based welder training simulator", Computers in Industry, vol. 20, No. 3, Oct. 1992, pp. 321-325, XP000205597, Elsevier Science Publishers, Amsterdam, NL.

Wuhan Onew Technology Co., Ltd., "Onew Virtual Simulation Expert", 16 pgs., printed Apr. 16, 2015.

Yao et al., 'Development of a Robot System for Pipe Welding'. 2010 International Conference on Measuring Technology and Mechatronics Automation. Retrieved from the Internet: http://ieeexplore.ieee.org/stamp/stamp.jsp? tp=&arnumber=5460347&tag=1; pp. 1109-1112, 4 pages.

EnergynTech Inc.; website printout; http://www.energyntech.com/; Advanced Metals Processing Technology & Flexible Automation for Manufacturing; Virtual Welder; Virtual training system for beginning welders; 2 page; 2014.

EnergynTech Inc.; website printout; http://www.energyntech.com/Zipper.html; Zipper Robot Performing a HiDep Weld; 1 page, 2014.

Terebes; Institute of Automation; University of Bremen; Project Motivation Problems Using Traditional Welding Masks; 2 page; 2015.

WeldWatch SoftwareNisible Welding; website printout; http://visiblewelding.com/weldwatch-software/4 pages; 2015.

Products/Visible Welding; Weldwatch Video Monitoring System; website prinout http://visible welding.com/products; 4 pages; 2015.

NSRP—Virtual Welding—A Low Cost Virtual Reality Welder Training System—Phase II—Final Report; Feb. 29, 2012; Kenneth Fast, Jerry Jones, Valerie Rhoades; 53 pages.

Notice of Allowance from U.S. Appl. No. 13/543,240 dated Sep. 3, 2015.

International Search Report and Written Opinion fro PCT/US12/45776 dated Oct. 1, 2012.

Office action from U.S. Appl. No. 12/499,687 dated Oct. 16, 2012.

Response from U.S. Appl. No. 12/499,687 dated Apr. 10, 2013.

Office action from U.S. Appl. No. 12/499,687 dated Jun. 26, 2013.

Response from U.S. Appl. No. 12/499,687 dated Nov. 25, 2013.

Office action from U.S. Appl. No. 12/499,687 dated Mar. 6, 2014.

Response from U.S. Appl. No. 12/499,687 dated Sep. 5, 2014.

Office action from U.S. Appl. No. 12/499,687 dated Nov. 6, 2014.

Office action from U.S. Appl. No. 13/543,240 dated Nov. 14, 2014.

Juan Vicenete Rosell Gonzales, "RV-Sold: simulator virtual para la formacion de soldadores"; Deformacion Metalica, Es. vol. 34, No. 301, Jan. 1, 2008.

The Goodheart-Wilcox Co., Inc., Weld Joints and Weld Types, Chapter 6, pp. 57-68, date unknown.

M. Ian Graham, Texture Mapping, Carnegie Mellon University Class 15-462 Computer Graphics, Lecture 10, 53 pages, dated Feb. 13, 2003.

Guu and Rokhlin, Technique for Simultaneous Real-Time Measurements of Weld Pool Surface Geometry and Arc Force, Welding Research Supplement—pp. 473-482, Dec. 1992.

Hills and Steele, Jr.; "Data Parallel Algorithms", Communications of the ACM, Dec. 1986, vol. 29, No. 12, p. 1170.

Hillis et al., "Data Parallel Algorithms", Communications of the ACM, vol. 29, No. 12, Dec. 1986, pp. 1170-1183.

Johannes Hirche, Alexander Ehlert, Stefan Guthe, Michael Doggett, Hardware Accelerated Per-Pixel Displacement Mapping, 8 pages, 2004.

J. Hu and Hi Tsai, Heat and mass transfer in gas metal arc welding. Part 1: the arc, found in ScienceDirect, International Journal of Heat and Mass Transfer 50 (2007), 14 pages, 833-846 Available online on Oct. 24, 2006 http://www.web.mst.edu./~tsai/publications/HU-IJHMT-2007-1-60.pdf.

Aidun, Daryush K., Influence of Simulated High-g on the Weld Size of Al-Li Alloy, Acta Astronautica, vol. 48, No. 2-3, pp. 153-156, 2001.

M. Jonsson, L. Karlsson, and L-E Lindgren, Simulation of Tack Welding Procedures in Butt Joint Welding of Plates Welding Research Supplement, Oct. 1985, pp. 296-302.

Kemppi ProTrainer, product data, 3 pages, printed Jan. 14, 2015.

Konstantinos Nasios (Bsc), Improving Chemical Plant Safety Training Using Virtual Reality, Thesis submitted to the University of Nottingham for the Degree of Doctor of Philosophy, 313 pages, Dec. 2001.

Leap Motion, Inc., product information, copyright 2013, 14 pages.

Learning Labs, Inc., Seabery, Soldamatic Augmented Reality Welding Trainers, 4 pgs., printed Mar. 20, 2014.

Lim et al., "Automatic classification of weld defects using simulated data and MLP neural network", Insight, vol. 49, No. 3, Mar. 2007.

Wade, Human uses of ultrasound: ancient and modern Department of Electrical and Computer Engineering, University of California at Santa Barbara 93106, USA. Ultrasonics (Impact Factor: 1.81). Apr. 2000; 38(1-8):1-5.

Production Monitoring 2 brochure, four (4) pages, The Lincoln Electric Company, May 2009.

The Lincoln Electric Company; CheckPoint Production Monitoring brochure; four (4) pages; http://www.lincolnelectric.com/assets/en_US/products/literature/s232.pdf; Publication S2.32; Issue Date Feb. 2012.

Lincoln Electric, VRTEX Virtual Reality Arc Welding Trainer, 9 pgs. Printed Feb. 2, 2014.

Lincoln Electric, Vrtex 360 Virtual Reality Arc Welding Trainer, 4 pgs., Oct. 2014.

Linholm, E., et al., "NVIDIA Testla: A Unifired Graphics and Computing Architecture", IEEE Computer Society, 2008.

Mahrle et al., "The influence of fluid flow phenomena on the laser beam welding process", Intl. J. of Heat and Fluid Flow, 23, pp. 288-297 (2002).

Steve Mann, Raymond Chun Bing Lo, Kalin Ovtcharov, Shixiang Gu, David Dai, Calvin Ngan, Tao Al' Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE), pp. 1-6, 6 pages, Apr. 29, 2012.

J.Y. (Yosh) Mantinband, Hillel Goldenberg, Llan Kleinberger, Paul Kleinberger, Autosteroscopic, field—sequential display with full freedom of movement OR Let the display were the shutter—glasses, yosh@3ality.com, (Israel) Ltd., 8 pages, 2002.

Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, 1 Apr. 2006, pp. 294-300.

Mechanisms and Mechanical Devices Sourcebook, Chironis, McGraw Hill, Neil Sclater, 2nd Ed. 1996.

Miller Electric Mfg. Co., "LiveArc Welding Performance Management System", 4 pg. brochure, Dec. 2014.

Miller Electric, Owner's Manual, Live Arc, Welding Performance Management System, Owners's Manual—OM-267 357A; 64 pgs., Jul. 2014.

Miller Electric Mgf Co.; MIG Welding System features weld monitoring software; NewsRoom 2010 (Dialog® File 992); © 2011 Dialog. 2010; http://www.dialogweb.com/cgi/dwclient?reg=1331233430487; three (3) pages; printed Mar. 8, 2012.

N. A. Tech., P/NA.3 Process Modeling and Optimization, 11 pages, Jun. 4, 2008.

(56) References Cited

OTHER PUBLICATIONS

NSRP ASE, Low-Cost Virtual Reality Welder Training System, 1 Page, 2008.
Nvidia Tesla: A Unified Graphics and Computing Architecture, IEEE Computer Society 0272-1732, Mar.-Apr. 2008.
Terrence O'Brien, "Google's Project Glass gets some more details", Jun. 27, 2012, Retrieved from the Internet: http://www.engadget.com/2012/06/27/googles-project-glass-gets-some-more-details/, 1 page, retrieved on Sep. 26, 2014.
Porter, et al., Virtual Reality Training, Paper No. 2005-P19, 14 pages, 2005.
Porter et al., Virtual Reality Welder Training, 29 pages, dated Jul. 14, 2006.
Porter, Virtual Reality Welder Trainer, Session 5: Joining Technologies for Naval Applications: earliest date Jul. 14, 2006 (http://weayback.archive.org), Edision Welding Institute; J. Allan Cote, General Dynamics Electric Boat; Timothy D. Gifford, VRSim, and Wim Lam, FCS Controls.
Praxair "The RealWeld Trainer System", two page brochure, 2013.
Ratnam and Khalid: "Automatic classification of weld defects using simulated data and an MLP neutral network." Insight vol. 49, No. 3; Mar. 2007.
William T. Reeves, "Particles Systems—A Technique for Modeling a Class of Fuzzy Objects", Computer Graphics 17:3 pp. 359-376, 1983, 17 pages.
Patrick Rodjito, Position tracking and motion prediction using Fuzzy Logic, 81 pages, 2006, Colby College, Honors Theses, Paper 520.
Russell and Norvig, "Artificial Intelligence: A Modern Approach", Prentice-Hall (Copyright 1995).
Schoder, Robert, "Design and Implementation of a Video Sensor for Closed Loop Control of Back Bead Weld Puddle Width," Massachusetts Institute of Technology, Dept. of Mechanical Engineering, May 27, 1983.
Seabury Soluciones, Soldamatic Welding Trainer Simulator, 30 pages, printed Jan. 14, 2015.
SIMFOR / CESOL, "RV-Sold" Welding Simulator, Technical and Functional Features, 20 pages, no date available.
Sim Welder, Train better welders faster, retrieved on Apr. 12, 2010 from: http://www.simwelder.com.
Training in a virtual environment gives welding students a leg up, retrieved on Apr. 12, 2010 from: http://www.thefabricator.com/article/arcwelding/virtually-welding.
Teeravarunyou, et al., "Computer Based Welding Training System", Intl J of Industrial Engineering, 16 (2), pp. 116-125 (2009).
Isaac Brana Veiga, Simulation of a Work Cell in the IGRIP Program, dated 2006, 50 pages.
ViziTech USA, Changing the Way America Learns, retrieved on Mar. 27, 2014 from http://vizitechusa.com/, 2 pages.
Response to Office Action dated Nov. 14, 2014 from U.S. Appl. No. 13/543,240 dated Mar. 13, 2015.
International Search Report and Written Opinion from PCT/IB2015/000777 dated Sep. 21, 2015.
International Search Report and Written Opinion from PCT/IB2015/000814 dated Nov. 5, 2015.

\* cited by examiner

WELDING TRAINING SYSTEM

CROSS-REFERENCE TO RELATED APPLICATIONS

This patent application is a continuation-in-part of U.S. patent application Ser. No. 12/499,687 filed on Jul. 8, 2009 and entitled "Method and System for Monitoring and Characterizing the Creation of a Manual Weld", the disclosure of which is hereby incorporated by reference herein in its entirety and made part of the present U.S. utility patent application for all purposes.

BACKGROUND OF THE INVENTION

The described invention relates in general to a system for training welders, and more specifically to a system for providing useful information to a welding trainee by capturing, processing, and presenting in a viewable format, data generated by the welding trainee in manually executing an actual weld in real time.

The manufacturing industry's desire for efficient and economical welder training has been a well documented topic over the past decade as the realization of a severe shortage of skilled welders is becoming alarmingly evident in today's factories, shipyards, and construction sites. A rapidly retiring workforce, combined with the slow pace of traditional instructor-based welder training has been the impetus for the development of more effective training technologies Innovations which allow for the accelerated training of the manual dexterity skills specific to welding, along with the expeditious indoctrination of arc welding fundamentals are becoming a necessity. The training system disclosed herein addresses this vital need for improved welder training and enables the monitoring of manual welding processes to ensure the processes are within permissible limits necessary to meet industry-wide quality requirements. To date, the majority of welding processes are performed manually, yet the field is lacking practical commercially available tools to track the performance of these manual processes. Thus, there is an ongoing need for an effective system for training welders to properly execute various types of welds under various conditions.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a system for training welders is provided. This system includes a data generating component, a data capturing component, and a data processing and visualization component. The data generating component further includes a substrate; at least one support adjustably mounted on or to the substrate, wherein the support may be horizontally oriented or vertically oriented; a jig positioned on the at least one support for consistently retaining a weld coupon in a predetermined position; at least one calibration block positioned on the jig, wherein the geometric configuration of the calibration block is specific to a particular type of weld joint; a weld coupon positioned on the jig adjacent to the calibration block, wherein the weld coupon further includes at least one piece of weldable material, and wherein weld metal is actually deposited on the weldable material by a trainee during a training exercise to form a weld; a welding gun for use by the trainee, wherein the welding gun is operative to form the weld; and at least one target mounted on the welding gun. The data capturing component further includes at least one imaging device for capturing images of the target, wherein the at least one imaging device is mounted on or near the substrate such that the imaging device has a clear view of the at least one target mounted on the welding gun. The data processing and visualization component further includes: at least one computer for receiving and analyzing information captured by the data capturing component, wherein the at least one computer is running software that includes a training regimen module, wherein the training regimen module includes a variety of weld types and a series of acceptable welding process parameters associated with creating each weld type; an object recognition module for recognizing the target; and a data processing module for comparing the information in the training regimen module to the information processed by the object recognition module; and at least one display device in electrical communication with the at least one computer for allowing the trainee to visualize the processed data in real time, wherein the visualized data is operative to provide the trainee with useful feedback regarding the characteristics and quality of the weld.

In accordance with another aspect of the present invention, a system for training welders is also provided. This system includes a data generating component, a data capturing component, and a data processing and visualization component. The data generating component further includes a training stand; at least one support adjustably mounted on the training stand, wherein the support may be positioned in a variety of spatial orientations; at least one welding process-specific jig positioned on the at least one support; at least one calibration block positioned on the jig, wherein the geometric configuration of the calibration block is specific to a particular type of weld joint; a weld coupon positioned on the weld-specific jig adjacent to the calibration block, wherein the weld coupon further includes at least two pieces of material, and wherein a trainee actually forms a weld joint between the at least two pieces of material during a training exercise; a welding gun for use by the trainee, wherein the welding gun is operative to form the weld joint; and at least one target mounted on the welding gun. The data capturing component further includes at least one imaging device for capturing images of the target, wherein the at least one imaging device is mounted on or near the training stand such that the imaging device has a clear view of the at least one target mounted on the welding gun. The data processing and visualization component further includes at least one computer for receiving and analyzing information captured by the data capturing component, wherein the at least one computer is running software that includes a training regimen module, wherein the training regimen module includes a variety of weld types and a series of acceptable welding process parameters associated with creating each weld type; an object recognition module for recognizing the target; and a data processing module for comparing the information in the training regimen module to the information processed by the object recognition module; and at least one display device in electrical communication with the at least one computer for allowing the trainee to visualize the processed data in real time or immediately following the weld, wherein the visualized data is operative to provide the trainee with useful feedback regarding the characteristics and quality of the weld.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
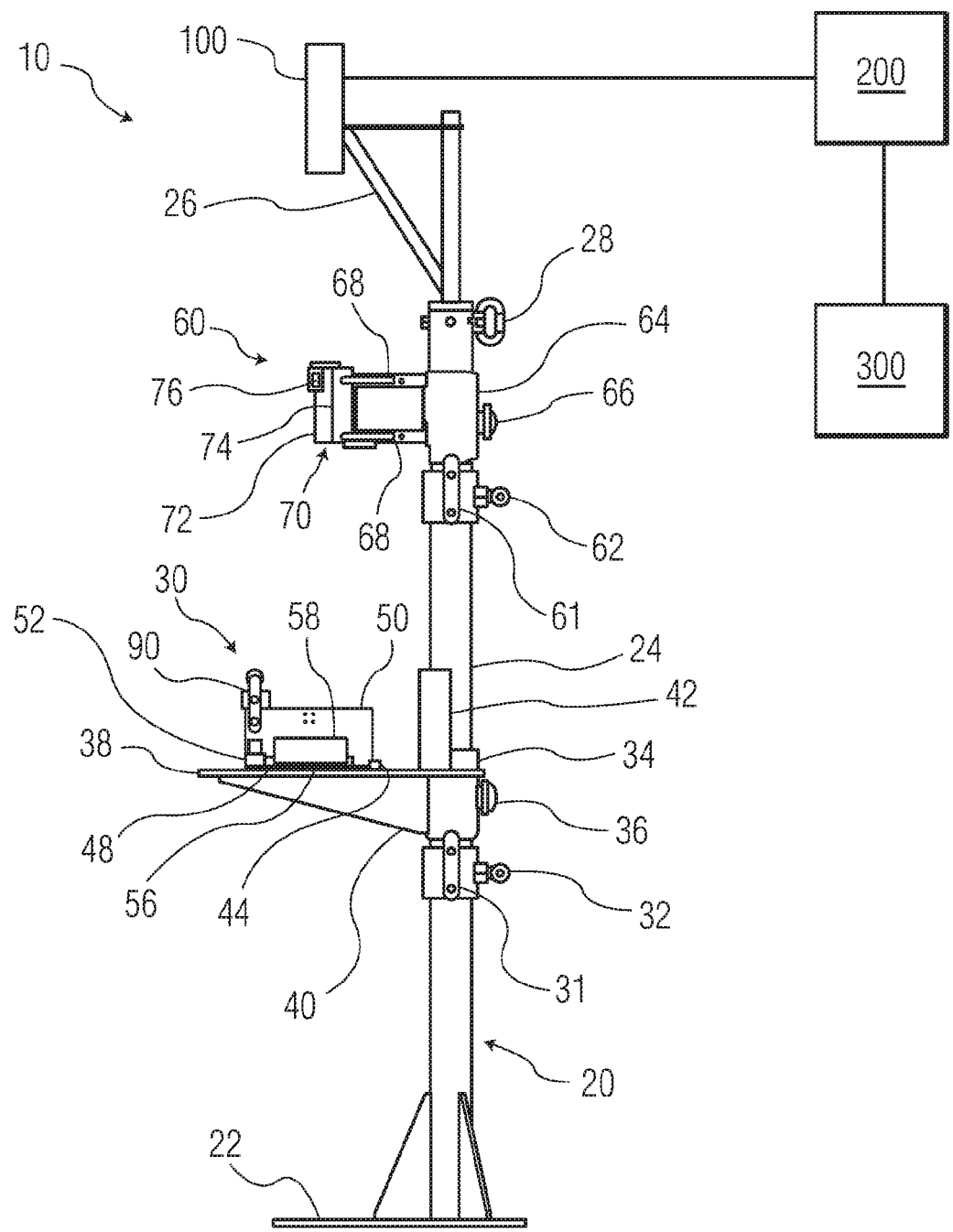
FIG. 1 provides a somewhat simplified side view of a portable or semi-portable welding training system in accordance with an exemplary embodiment of the present invention.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to an advanced system for welding instruction and training that provides an affordable tool for measuring manual welding technique and comparing that technique with established procedures. The training applications of this invention include: (i) screening applicant skill levels; (ii) assessing trainee progress over time; (iii) providing real-time coaching to reduce training time and costs; and (iv) periodically re-testing welder skill levels with quantifiable results. Processing monitoring and quality control applications include: (i) identification of deviations from preferred conditions in real time; (ii) documenting and tracking compliance with procedures over time; (iii) capturing in-process data for statistical process control purposes (e.g., heat input measurements); and (iv) identifying welders needing additional training.

The present invention, in various exemplary embodiments, measures torch motion and gathers process data during welding exercises using a single or multiple camera tracking system based on target image analysis. This invention is applicable to a wide range of processes including, but not necessarily limited to, GMAW, FCAW, SMAW, GTAW, and cutting. The invention is expandable to a range of work-piece configurations, including large sizes, various joint type, pipe, plate, and complex shapes. Measured parameters include work angle, travel angle, standoff distance, travel speed, weave, voltage, current, wire feed speed, and arc length. The training component of the present invention may be pre-populated with specific jobs or it may be customized by an instructor. Data is automatically saved and recorded, a post-weld analysis scores performance, and progress is tracked over time. This system may be used throughout an entire welding training program and may include both in-helmet and on-screen feedback. With reference now to the Figures, one or more specific embodiments of this invention shall be described in greater detail.

FIGS. 1-4 provide various views illustrative views of welding training system 10 in accordance with an exemplary embodiment the present invention. As shown in FIG. 1, portable training stand 20 includes a substantially flat base 22 for contact with a floor or other horizontal substrate, rigid vertical support column 24, camera or imaging device support 26, and pull pin 28 for adjusting the height of imaging device support 26. In most embodiments, welding training system 10 is intended to be portable or at least moveable from one location to another, therefore the overall footprint of base 22 is relatively small to permit maximum flexibility with regard to installation and use. As shown in FIG. 1, welding training system 10 may be used for training exercises that include horizontally or vertically oriented workpieces or both. In the exemplary embodiments shown in the Figures, training stand 20 is depicted as a unitary or integrated structure that is capable of supporting the other components of system. In other embodiments, stand 20 is absent and the various components of system 10 are supported by whatever suitable structural or supportive means may be available. Thus, within the context of this invention, "stand" 20 is defined as any single structure or, alternately, multiple structures that are capable of supporting the components of system 10.

Figure 2:
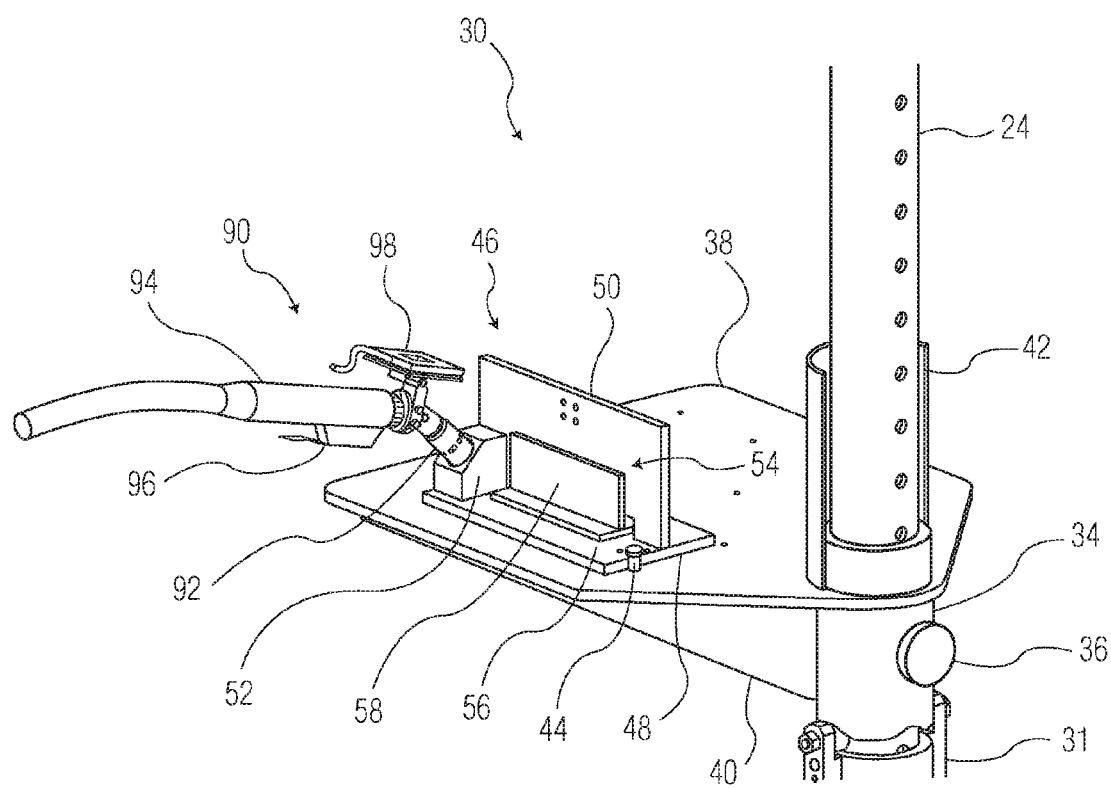
FIG. 2 provides an isometric view of the horizontal fixture of the welding training system of FIG. 1.
Figure 3:
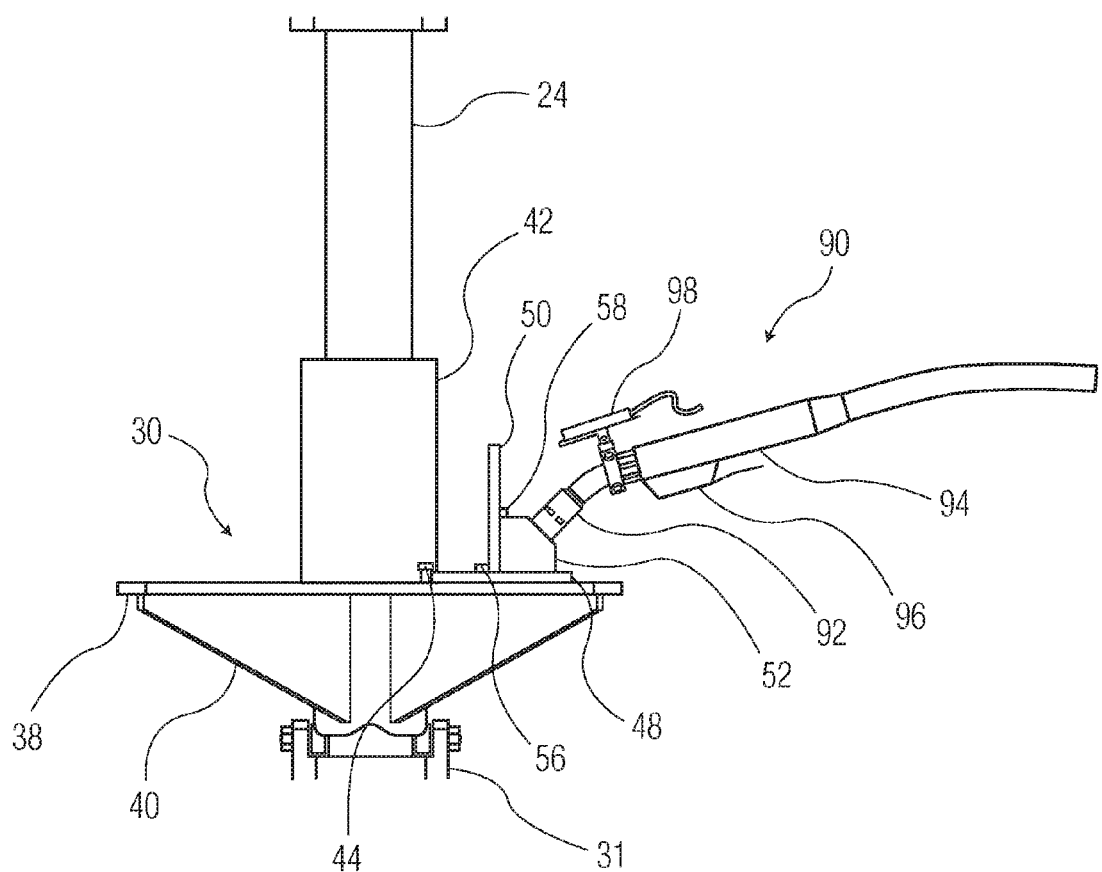
FIG. 3 provides a front view of the horizontal fixture of the welding training system of FIG. 1.

With reference to FIGS. 2-3, training exercises that include horizontally oriented workpieces involve the use of horizontal fixture 30, which is slidably attached to vertical support column 24 by collar 34, which includes adjustment knob 36 for releasing collar 34 and allowing it to slide upward or downward on support column 24. Collar 34 is further supported on column 24 by cam roller assembly 31, which includes pull pin 32 for releasing cam roller assembly 31 and allowing it to slide upward or downward on support column 24. Horizontal fixture 30 includes training platform 38, which is used for flat and horizontal training positions, and which is supported by one or more brackets 40. In some embodiments, a shield 42 is attached to training platform 38 for protecting the surface of support column 24 from heat damage. Training platform 38 further includes at least one peg 44 for securing weld position-specific jig 46 to the surface of the training platform. The structural configuration or general characteristics of weld position-specific jig 46 are variable based on the type of weld process that is the subject of a particular training exercise. In the exemplary embodiment shown in the Figures, first 48 and second 50 structural components of weld position-specific jig 46 are set at right angles to one another and positioned on training platform 38 adjacent to calibration block 52. The specific geometric characteristics of calibration block 52 are also variable and correspond to the type of weld process that is the subject of a particular training exercise. The characteristics of weld coupon 54 are also variable based on the type of weld process that is the subject of a particular training exercise and in the exemplary embodiment shown in the Figures, first 56 and second 58 portions of weld coupon 54 are set at right angles to one another and positioned on weld position-specific jig 46 adjacent to calibration block 52.

Figure 4:
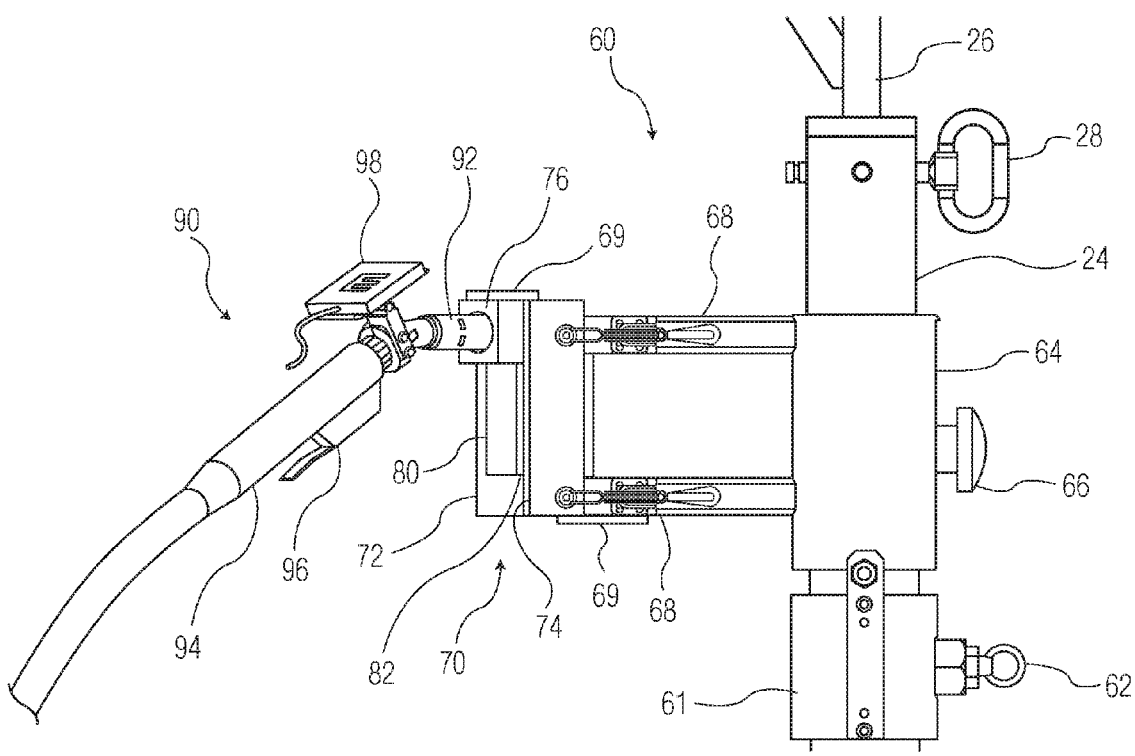
FIG. 4 provides a side view of the vertical fixture of the welding training system of FIG. 1.

With reference to FIG. 4, training exercises that include vertically oriented workpieces involve the use of vertical fixture 60, which is slidably attached to vertical support column 24 by collar 64, which includes adjustment knob 66 for releasing collar 64 and allowing it to slide upward or downward on support column 24. Collar 64 is further supported on column 24 by cam roller assembly 61, which includes pull pin 62 for releasing cam roller assembly 61 and allowing it to slide upward or downward on support column 24. Vertical fixture 60 is used for pipe and vertical training positions and includes grasping arms 68 for holding training platform 69 to which weld position-specific jig 70 is attached. The structural configuration or general characteristics of weld position-specific jig 70 are variable based on the type of weld process that is the subject of a particular training exercise. In the exemplary embodiment shown in the Figures, first 72 and second 74 structural components of weld position-specific jig 70 are set at right angles to one another and positioned on training platform 69 adjacent to calibration block 76. The specific geometric characteristics of calibration block 76 are also variable and correspond to the type of weld process that is the subject of a particular training exercise. The characteristics of weld coupon 78 are also variable based on the type of weld process that is the subject of a particular training exercise and in the exemplary embodiment shown in the Figures, first 80 and second 82 portions of weld coupon 78 are set at right angles to one another and positioned on weld position-specific jig 70 adjacent to calibration block 76.

As best shown in FIGS. 2-3, welding gun or torch 90, which in this invention is a an actual, completely functional welding gun (as opposed to a virtual welding gun or torch), includes nozzle 92, body 94, trigger 96, and at least one target 98, which is mounted on welding gun 90. When welding gun 90 is properly positioned within either calibration block 58 or calibration block 76, target 98 is in view of data capturing component 100, which typically includes at least one digital camera or imaging device. Target 98 (which many be one or more actual targets), when placed in a calibration block is used to "train" welding training system 10 to recognize a known object such that position and orientation data may be generated using images captured by data capturing component 100 during a training exercise. In some embodiments, the imaging device further includes a filter, target 98 further includes a light emitting component that emits light over a range of predetermined wavelengths, and the filter only accepts light corresponding to the predetermined wavelengths emitted by the light emitting component. This configuration reduces the negative impact that saturation of the imaging device by the light produced by a welding arc can create. As is detailed below and also in U.S. patent application Ser. No. 12/499,687 (incorporated herein by reference, in its entirety), data capturing component 100 is in electronic communication with data processing component 200 which is in electronic communication with data visualization component 300. In some embodiments, data processing component 200 and data visualization component 300 reside within or on the same computer-based system. These components of the present invention cooperate with one another during a welding training exercise to provide the trainee with useful information in real time.

Figure 5:
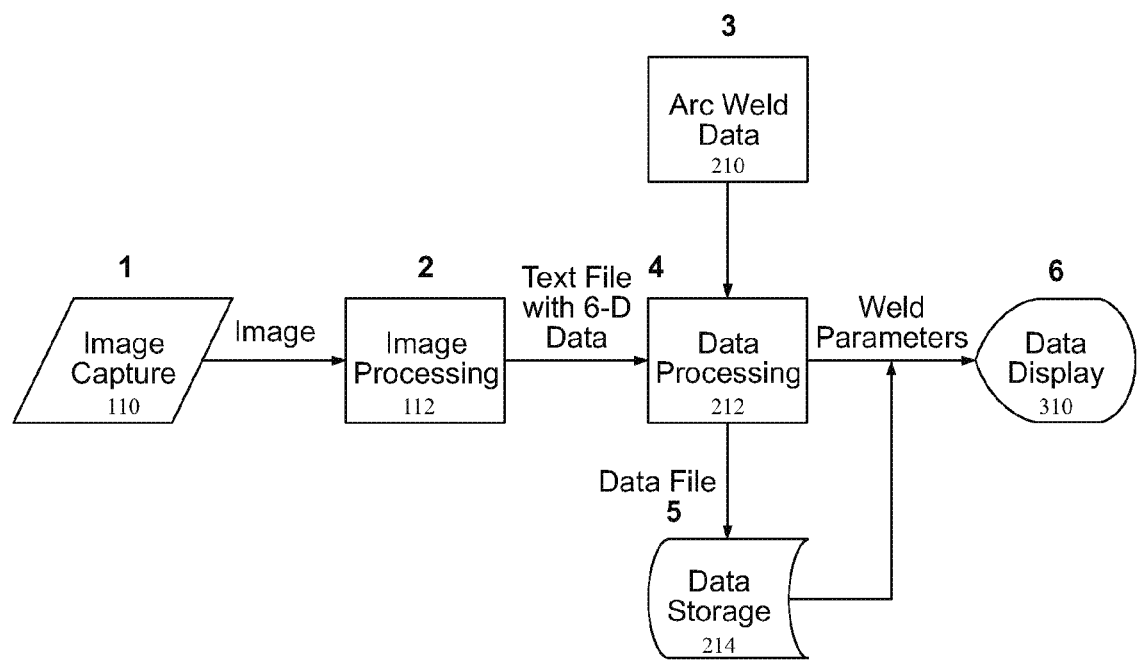
FIG. 5 is a flow chart illustrating the flow of information through the data processing and visualization component of an exemplary embodiment of the present invention.

As shown in FIG. 5, in an exemplary embodiment of the present invention, the flow of information through welding training system 10 occurs in six basic steps: (1) image capture 110; (2) image processing 112; (3) input of arc weld data 210, such as known or preferred weld parameters; (4) data processing 212; (5) data storage 214; and (5) data display 310. The input aspect of image capture step 110 includes capturing images of target 98 with one or more off-the shelf high-speed-vision cameras such as, for example, those operating at greater than 100 frames per second and having a gigabit-Ethernet connection, while the output aspect typically includes creating of an image file at over 100 frames per second. The input aspect of image processing step 112 includes analyzing individual images of the target looking for a match to a known "trained" object (i.e., the calibrated target). Upon recognition of a known object, position and orientation are calculated relative to the "trained" object position and orientation. Images are typically processed at a rate of more than 10 times per second. The output aspect of image processing step 112 includes creation of a text file that includes x-axis, y-axis, and z-axis positional data and roll, pitch, and yaw orientation data, as well as time stamps and software flags. The text file may be streamed or sent at a desired frequency. The input aspect of data processing step 212 includes raw positional and orientation data typically requested at about 15-20 times per second, while the output aspect includes transforming this raw data into useful welding parameters with algorithms specific to a selected process and joint type. The input aspect of data storage step 214 includes storing welding trial data as a *.dat file, while the output aspect includes saving the data for review and tracking, saving the date for review on a monitor at a later time, and/or reviewing the progress of the student at a later time. Student progress may include total practice time, total arc time, total arc starts, and individual parameter-specific performance over time. The input aspect of data display step 310 includes welding trial data that further includes work angle, travel angle, tip-to-work distance/torch offset, travel speed, torch proximity to axis, voltage, current, wire-feed speed, while the output aspect involves data that may viewed on a monitor, in-helmet display, heads-up display, or combinations thereof, wherein parameters are plotted on a time-based axis and compared to upper and lower thresholds or preferred variations, such as those trained by recording the motions of an expert welder. Current and voltage may be measured in conjunction with travel speed to determine heat input and the welding process parameters may be used to estimate arc length. Position data may be transformed into weld start position, weld stop position, weld length, weld sequence, welding progression, or combinations thereof and current and voltage may be measured in conjunction with travel speed to determine heat input.

The data processing and visualization components of the present invention (200 and 300 respectively) typically include at least one computer for receiving and analyzing information captured by the data capturing component 100. During operation of welding training system 10, this computer is typically running software that includes a training regimen module, an object recognition module, and a data processing module. The training regimen module includes a variety of weld types and a series of acceptable welding process parameters associated with creating each weld type. Any number of known or AWS weld joint types and the acceptable parameters associated with these weld joint types may be included in the training regimen module, which is accessed and configured by a course instructor prior to the beginning of a training exercise. The weld process and/or type selected by the instructor determine which weld process-specific jig, calibration block, and weld coupon are used for any given training exercise. The object recognition module is operative to train the system to recognize a known object (target 98) and for then using target 98 to calculate positional and orientation data for welding gun 90 as an actual manual weld is completed by a trainee. The data processing module compares the information in the training regimen module to the information processed by the object recognition module and outputs the comparative data to a display device such as a monitor or head-up display. The monitor allows the trainee to visualize the processed data in real time and the visualized data is operative to provide the trainee with useful feedback regarding the characteristics and quality of the weld. The visual interface of welding training system 10 may include a variety of features related to the input of information, login, setup, calibration, practice, analysis, and progress tracking. The analysis screen typically displays the welding parameters found in the training regimen module, including (but not limited to) work angle, travel angle, contact tip-to-work distance/torch offset, travel speed, torch proximity to axis, voltage, current, and wire-feed speed. Multiple display variations are possible with the present invention.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A system for training welders, comprising:
   (a) a data generating component, wherein the data generating component includes:
      (i) a substrate;
      (ii) at least one support adjustably mounted on the substrate, wherein the support may be horizontally oriented or vertically oriented;
      (iii) a jig positioned on the at least one support, wherein the jig is operative to consistently retain a weld coupon in a predetermined position;
      (iv) at least one calibration block positioned on the jig, wherein the at least one calibration block includes a geometric configuration, and wherein the geometric configuration is specific to a particular type of weld joint;
      (v) a weld coupon positioned on the jig adjacent to the calibration block, wherein the weld coupon further includes at least one piece of weldable material, and wherein a weld is actually produced by a trainee during a training exercise;
      (vi) a welding gun for use by the trainee, wherein the welding gun is operative to form the weld; and
      (vii) at least one target mounted on the welding gun;
   (b) a data capturing component, wherein the data capturing component includes:
      (i) at least one imaging device for capturing images of the target, wherein the at least one imaging device is mounted on or near the substrate such that the imaging device has a clear view of the at least one target mounted on the welding gun; and
   (c) a data processing and visualization component, wherein the data processing and visualization component includes:
      (i) at least one computer for receiving and analyzing information captured by the data capturing component, wherein the at least one computer is running software that includes:
         (a) a training regimen module, wherein the training regimen module includes a variety of weld types and a series of acceptable welding process parameters associated with creating each weld type;
         (b) an object recognition module for recognizing the target; and
         (c) a data processing module for comparing the information in the training regimen module to the information processed by the object recognition module; and
      (ii) at least one display device in electrical communication with the at least one computer for allowing the trainee to visualize the processed data in real time or immediately following the weld, wherein the visualized data is operative to provide the trainee with information regarding a training exercise.

2. The system of claim 1, wherein the system further includes at least one electronic storage device for storing information from each training exercise for later review.

3. The system of claim 1, wherein the imaging device further includes a filter, wherein the target further includes a light emitting component that emits light over a predetermined range of wavelengths, and wherein the filter only accepts light corresponding to the predetermined range of wavelengths emitted by the light emitting component.

4. The system of claim 1, wherein the at least one imaging device is a digital high-speed vision camera.

5. The system of claim 1, wherein the output of the imaging device is an image file at over 10 frames per second.

6. The system of claim 1, wherein the welding gun has a position and orientation, and wherein the data processing and visualization component receives and analyzes individual images captured by the imaging device and recognizes the presence of the target in those images, wherein upon recognition of the target, the position and orientation of the welding gun are calculated relative to the position and orientation of the target, and wherein the individual images captured by the imaging device are processed at a rate of at least 10 times per second.

7. The system of claim 1, wherein the data processing and visualization component outputs data consisting of x-axis, y-axis, and z-axis position data and roll, pitch, and yaw orientation data, and wherein the data may be streamed to the display device or sent to the display device at a predetermined frequency.

8. The system of claim 7, wherein the data processing and visualization component transforms the position and orientation data into welding process parameters, wherein the welding process parameters include at least one of a work angle, a travel angle, a torch offset, a travel speed, a torch proximity to axis, a voltage, a current, and a wire-feed speed, and wherein the welding process parameters established from the position and orientation data are compared to the series of acceptable welding process parameters associated with creating each weld type in the training regimen module, at least one of which is visualized on the display device by a trainee during a training exercise.

9. The system of claim 8, wherein the current and voltage are measured in conjunction with travel speed to determine heat input.

10. The system of claim 8, wherein the welding process parameters are used to estimate arc length.

11. The system of claim 7, wherein the data processing and visualization component transforms the position data into weld start position, weld stop position, weld length, weld sequence, welding progression, or combinations thereof.

12. The system of claim 8, wherein the welding parameters established from the position and orientation data are plotted on a time-based axis and compared to a preferred variation for each parameter.

13. The system of claim 12, wherein the preferred variation is trained by recording a sequence of motions performed by an expert welder.

14. The system of claim 1, wherein the display device is a computer monitor, a helmet display, a heads-up display, or combinations thereof.

15. A system for training welders, comprising:
(a) a data generating component, wherein the data generating component further includes:
  (i) an adjustable training stand;
  (ii) at least one support adjustably mounted on the training stand, wherein the support may be positioned in a variety of spatial orientations;
  (iii) a jig positioned on the at least one support, wherein the jig is operative to consistently hold a weld coupon in a predetermined position;
  (iv) at least one calibration block positioned on the jig, wherein the at least one calibration block includes a geometric configuration, and wherein the geometric configuration is specific to a particular type of weld joint;
  (v) a weld coupon positioned on the jig adjacent to the calibration block, wherein the weld coupon further includes at least one piece of weldable material, and wherein a weld is actually produced by a trainee during a training exercise;
  (vi) a welding gun for use by the trainee, wherein the welding gun is operative to form the weld; and
  (vii) at least one target mounted on the welding gun;
(b) a data capturing component, wherein the data capturing component includes:
  (i) at least one imaging device for capturing images of the target, wherein the at least one imaging device is mounted on or near the training stand such that the imaging device has a clear view of the at least one target mounted on the welding gun; and
(c) a data processing and visualization component, wherein the data processing and visualization component includes:
  (i) at least one computer for receiving and analyzing information captured by the data capturing component, wherein the at least one computer is running software that includes:
    (a) a training regimen module, wherein the training regimen module includes a variety of weld types and a series of acceptable welding process parameters associated with creating each weld type;
    (b) an object recognition module for recognizing the target; and
    (c) a data processing module for comparing the information in the training regimen module to the information processed by the object recognition module; and
  (ii) at least one display device in electrical communication with the at least one computer for allowing the trainee to visualize the processed data in real time or immediately following the weld, wherein the visualized data is operative to provide the trainee with information regarding a training exercise.

16. The system of claim 15, wherein the system further includes at least one electronic storage device for storing information from each training exercise for later review.

17. The system of claim 15, wherein the entire system is portable and may be moved and operated in a variety of different locations.

18. The system of claim 15, wherein the imaging device further includes a filter, wherein the target further includes a light emitting component that emits light over a predetermined range of wavelengths, and wherein the filter only accepts light corresponding to the predetermined range of wavelengths emitted by the light emitting component.

19. The system of claim 15, wherein the at least one imaging device is a digital high-speed vision camera.

20. The system of claim 15, wherein the welding gun has a position and orientation, and wherein the data processing and visualization component receives and analyzes individual images captured by the imaging device and recognizes the presence of the target in those images, wherein upon recognition of the target, the position and orientation of the welding gun are calculated relative to the position and orientation of the target, and wherein the individual images captured by the imaging device are processed at a rate of at least 10 times per second.

21. The system of claim 15, wherein the data processing and visualization component outputs data consisting of x-axis, y-axis, and z-axis position data and roll, pitch, and yaw orientation data, and wherein the data may be streamed to the display device or sent to the display device at a predetermined frequency.

22. The system of claim 21, wherein the data processing and visualization component transforms the position and orientation data into welding process parameters, wherein the welding process parameters include at least one of a work angle, a travel angle, a torch offset, a travel speed, a torch proximity to axis, a voltage, a current, and a wire-feed speed, and wherein the welding process parameters established from the position and orientation data that are compared to the series of acceptable welding process parameters associated with creating each weld type in the training regimen module, at least one of which is visualized on the display device by a trainee during a training exercise.

23. The system of claim 22, wherein the current and voltage are measured in conjunction with travel speed to determine heat input.

24. The system of claim 22, wherein the welding process parameters are used to estimate arc length.

25. The system of claim 21, wherein the data processing and visualization component transforms the position data into weld start position, weld stop position, weld length, weld sequence, welding progression, or combinations thereof.

26. The system of claim 22, wherein the welding parameters established from the position and orientation data are plotted on a time-based axis and compared to a preferred variation for each parameter.

27. The system of claim 26, wherein the preferred variation is trained by recording a sequence of motions performed by an expert welder.

28. The system of claim 15, wherein the display device is a computer monitor, a helmet display, a heads-up display, or combinations thereof.

* * * * *